United States Patent [19]
McHugh et al.

[11] 4,043,509
[45] Aug. 23, 1977

[54] ACTUATION SYSTEM FOR A GAS TURBINE ENGINE EXHAUST DEVICE

[75] Inventors: Donald P. McHugh, Wyoming; Donald F. Cook, Goshen, both of Ohio

[73] Assignee: General Electric Company, Cincinnati, Ohio

[21] Appl. No.: 686,062

[22] Filed: May 13, 1976

[51] Int. Cl.$^2$ .............................. F02C 3/06; F02K 1/12
[52] U.S. Cl. ............................... 239/265.41; 60/262; 60/271
[58] Field of Search ................. 60/262, 226 R, 226 A, 60/224, 271; 239/265.17, 265.25, 265.33, 265.39, 265.41

[56] References Cited
U.S. PATENT DOCUMENTS

| | | | |
|---|---|---|---|
| 2,969,641 | 1/1961 | Schaefer | 239/265.39 |
| 3,537,647 | 11/1970 | Camboulives et al. | 239/265.39 |
| 3,610,533 | 10/1971 | Johnson et al. | 60/262 |
| 3,767,120 | 10/1973 | Harmon | 239/265.39 |

Primary Examiner—Carlton R. Croyle
Assistant Examiner—Robert E. Garrett

Attorney, Agent, or Firm—Robert C. Lampe, Jr.; Derek P. Lawrence

[57] ABSTRACT

A gas turbine engine actuation system for simultaneously controlling the flow areas defined by two generally coannular ducts, each duct terminating in a nozzle of the variable flap variety. A bell crank pivotable about an axis on the outer (secondary) nozzle is link-connected to the inner (primary) nozzle and also to a translatable actuation ring. The geometry of the flaps, link and bell crank is such that when the secondary nozzle is positioned by the ring and bell crank, the movement thereof is transferred to the primary nozzle to modulate the throat areas defined thereby. Where the secondary (supersonic) nozzle is of the divergent variety extending downstream of the primary nozzle so as to provide a common expansion surface and exit area, a link connection between one of the secondary nozzle flaps and the actuation ring causes simultaneous exit area and throat area modulation in a predetermined relationship. A method is provided for actuating the nozzles between the augmented and unaugmented thrust operating modes.

8 Claims, 4 Drawing Figures

ACTUATION SYSTEM FOR A GAS TURBINE ENGINE EXHAUST DEVICE

BACKGROUND OF THE INVENTION

This invention relates to gas turbine engine exhaust devices and, more particularly, to a simplified actuation system for simultaneously controlling the geometry of multiple concentric exhaust nozzles, and a method of actuating same.

Exhaust systems are provided to direct the exhaust gases rearwardly from a gas turbine engine and into the atmosphere at a velocity and density necessary to produce the required thrust. The advent of new variable mission aircraft has spurred the development of new variable cycle propulsion systems capable of ultra-efficient operation at more than one operating condition. One of the particularly significant objectives of these so-called "variable cycle" gas turbine engines is the desire to maintain high airflow rates through the engine even at relatively low power settings. Typically, airflow varies with thrust. However, in the variable cycle engine, if airflow is maintained as power is decreased two advantages will result. First, air which would normally be "spilled" around the engine inlet will now be captured, thus reducing inlet drag. Secondly, since the exhaust nozzle must be opened to reduce thrust, afterbody drag is reduced.

Furthermore, the performance of any exhaust nozzle is dictated, to a large extent, by its internal geometry which is dictated by the exhaust gas aerodynamic parameters. When the operating range of a gas turbine engine is relatively narrow and the aerodynamic parameters such as pressure, temperature and velocity are relatively constant, the internal geometry may be optimized at the time of manufacture since any performance benefits obtained by providing a variable geometry capability are offset by increased weight, complexity and cost. By definition, however, contemplated variable cycle engines of the future will have wide operating ranges and large excursions in aerodynamic parameters. The requirements of high airflow at low thrust, and considerations of performance, noise and economics will dictate the necessity of variable geometry exhaust nozzles in variable cycle engines.

Some of the more attractive variable cycle gas turbine engines have several coaxial exhaust streams and a similar number of exhaust nozzles. Each nozzle must be actuated in cooperation and in coordination with the other nozzle to optimize the engine performance over the entire operating cycle. The problem confronting the industry is to develop a single actuation system which can simultaneously control such multiple concentric nozzles over this wide range of operation. This will result in savings of weight, complexity and cost.

SUMMARY OF THE INVENTION

Accordingly, it is the primary object of the present invention to provide a means for actuating concentric nozzles in a dual-flow gas turbine engine utilizing only one actuation system.

It is a further object of the present invention to provide a method for operating concentric nozzles in a dual-flow turbine engine.

It is yet another object of the present invention to provide an actuation system which permits flow modulation between multiple coaxial ducts.

These and other objects and advantages will be more clearly understood from the following detailed, description, drawings and specific examples, all of which are intended to be typical of rather than in any way limiting to the scope of the present invention.

Briefly stated, the above objectives are accomplished in a multiple-duct gas turbine engine wherein two flow streams, inner and outer, are contained by generally coannular ducts. The outer duct terminates in a secondary, variable geometry nozzle of the convergent-divergent variety which defines the exit of the exhaust device, and which comprises three serially connected flaps, the first and third of which are connected to the fixed, outer duct structure. The inner duct terminates in a primary, variable nozzle which defines the throat of the inner flow stream and, in cooperation with the secondary, variable nozzle forms a variable area throat therebetween for the outer flow stream.

The actuation system comprises connecting means in the form of an over-center bell crank and link assembly which connects the primary and secondary variable nozzles, the geometry of the flaps, links and bell crank being such that when the secondary nozzle is positioned by an actuator, the movement thereof is transferred to the primary, variable nozzle so as to simultaneously schedule the exit area, inner stream throat area and outer stream throat area in a predetermined relationship.

In the preferred embodiment, the nozzles may be actuated between an augmented (afterburning) thrust mode and an unaugmented mode. During the augmented mode of operation the outer duct flow is minimized by maintaining a nearly closed outer stream throat area while the inner stream is mixed with fuel, combusted and ejected through the secondary nozzle. As thrust is reduced during augmentation, the unique geometry of the actuation system simultaneously reduces the primary nozzle throat and secondary nozzle exit area without increase in outer stream throat area. At lower thrust settings, as the engine comes off the afterburning mode and engine airflow is maintained, the outer stream throat area is initially scheduled to increase the decreasing primary nozzle area, after which it continues to increase as the primary nozzle area increases due to the overcenter construction of the connecting means. Heretofore, such dual nozzle scheduling and actuation required two actuation and control systems.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

FIG. 4 is similar to FIG. 1 and depicts the actuation system in a second operative mode.

DESCRIPTION OF THE PREFERRED EMBODIMENT

Figure 1:
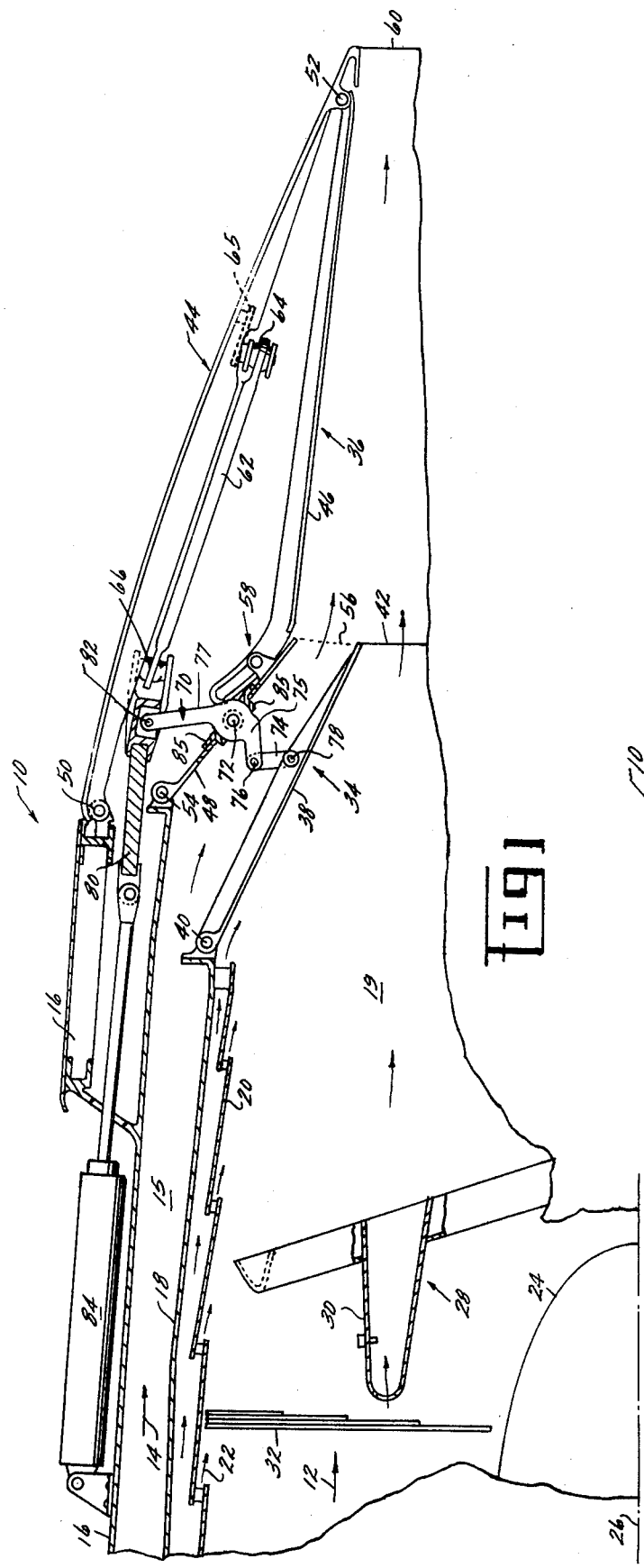
FIG. 1 is a cross-sectional view of a gas turbine engine exhaust device depicting the actuation system of the subject invention in one operative mode.

Referring to the drawings wherein like numerals correspond to like elements throughout, attention is first directed to FIG. 1 wherein a gas turbine engine exhaust device indicated generally at 10, for use with the present invention, is diagrammatically shown. Hot gases of combustion are expanded through a turbine, not shown, in a manner well known in the art and enter exhaust device 10 from the left as depicted by vector 12. Hereinafter, this is referred to as the inner flow stream. An outer flow stream, pressurized by a fan, for example, also enters from the left as indicated by vector 14 in coannular relationship to the inner flow stream. An outer flow passage 15 is defined, in part, by fixed outer duct 16 and coannular inner duct 18, said ducts comprising fixed engine structure. Inner flow passage 19 carrying inner stream 12 is defined, in part, by inner duct 18 which may be provided with a thermal liner 20 of a type well known in the art and through which cooling flow, bled from a pressurized upstream source, may pass as indicated by arrows 22. The inner flow passage is further defined by rigid core plug 24, and the entire device is generally symmetrical about engine centerline 26. In the embodiment of FIG. 1, the inner flow stream may be augmented by an afterburner 28 comprising flameholder gutters 30 and fuel injection tubes 32, also of a variety well understood in the art. Thus, the exhaust device is shown to be associated with a multiple-duct gas turbine engine of the augmented variety. Such an engine requires two separate exhaust nozzles, primary nozzle 34 and a common, secondary nozzle 36, both fully variable in a predetermined manner as will now be described.

Primary nozzle 34 comprises a plurality of flaps 38, only one of which is shown for clarity, arranged in an annulus and hinge-connected at 40 to the downstream terminus of inner duct 18. The downstream end of flap 38 defines the throat 42 of the inner flow passage 19, the area of which (hereinafter denominated $A_{42}$) may be changed by varying the position of flaps 38 through rotation about hinge 40.

Secondary nozzle 36 for expanding the flow comprises a downstream extension of outer duct 16. In particular, it comprises three pluralities of annular flaps 44, 46 and 48 (only one of each being shown for clarity). Flap 44 may comprise an outer flow path, or boattail, of the exhaust device 10 and is hinge-connected to the rigid outer duct structure 16 at an axis at 50 and connected to flap 46 at their mutual downstream ends by means of hinge connection 52. Convergent flap 48 is hinge-connected to the outer duct structure 16 about an axis at 54 and, in cooperation with flap 38 of the primary nozzle, forms a variable area throat 56 (the area of which is hereinafter denominated $A_{56}$) for outer flow passage 15, the throat being the minimum annulus area between flaps 38 and 48. Thus, the throat 56 area variation may be obtained by rotating flap 48 about hinge 54 to a selected position relative to flap 38 and vice versa.

Guided expansion of the comingled flows downstream of throats 42 and 56 is provided by divergent flap 46 which is connected to the downstream end of flap 48 through a contoured cam and slot arrangement at 58. Divergent flap 46 is generally rotatable at 58 to form the guided expansion of both the inner and outer flow streams to the exhaust device exit 60, the area of which is hereinafter denominated $A_{60}$. Flap 44 is positioned relative to hinge 50 by actuator link 62 which is connected thereto by means of ball joint 64 and bell crank 65. The other end of link 62 is operatively connected to an actuating ring 80, soon to be described, by means of ball joint connection 66. Clearly, exit area $A_{60}$ is controlled primarily by the positioning of link 62 which, in turn, positions flaps 44 and 46.

Only one simple actuation system is required to provide the complex area requirements imposed by a variable cycle engine. More particularly, the primary and secondary nozzles are linked together by a connecting means comprising a bell crank 70 pivotably connected to flap 48 at 72, and a link 74, the opposite ends of which are pivotably connected to bell crank arm 75 at 76 and flap 38 at 78. This comprises an over-center construction, the advantage of which will become obvious later. Clearly, a plurality of such links and bell cranks would be provided, but again only one is depicted for simplicity. The other bell crank arm 77 is connected to an axially translatable actuation ring 80 at 82. The axial position of actuation ring 80 is controlled by means of any state-of-the-art actuator, such as hydraulic actuator 84. Accordingly, the angular position of flap 38 is determined by the extent of the axial displacement of actuation ring 80 and the subsequent motion of the over-center bell crank (70) and link (74) assembly. Rotation of bell crank 70 is limited by means of stops 85 which engage the upper bell crank arm 77. Furthermore, the angular position of flap 48 is determined by the extent of the axial displacement of actuation ring 80 and the subsequent travel of bell crank pivot point 72 caused by movement of the upper bell crank arm 77. Flaps 44 and 46 are constrained to move in a predetermined relationship with flap 48 due to the cam and slot arrangement at 58, hinges 50 and 52, and actuator link 62. By proper tailoring of the entire system, an efficient exhaust nozzle area and area ratio schedule can be maintained.

Figure 2:
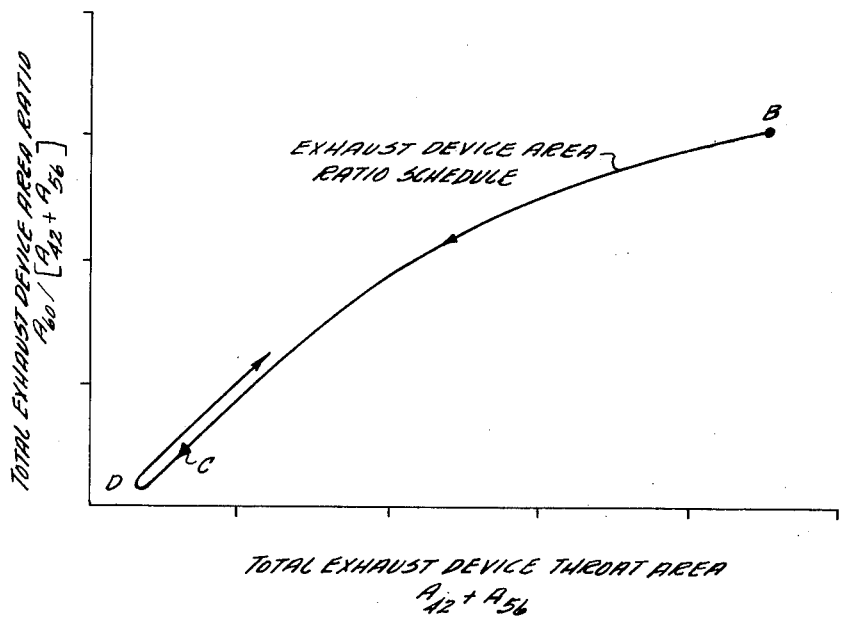
FIG. 2 graphically depicts the area ratio schedule for the actuation system of FIG. 1.
Figure 3:
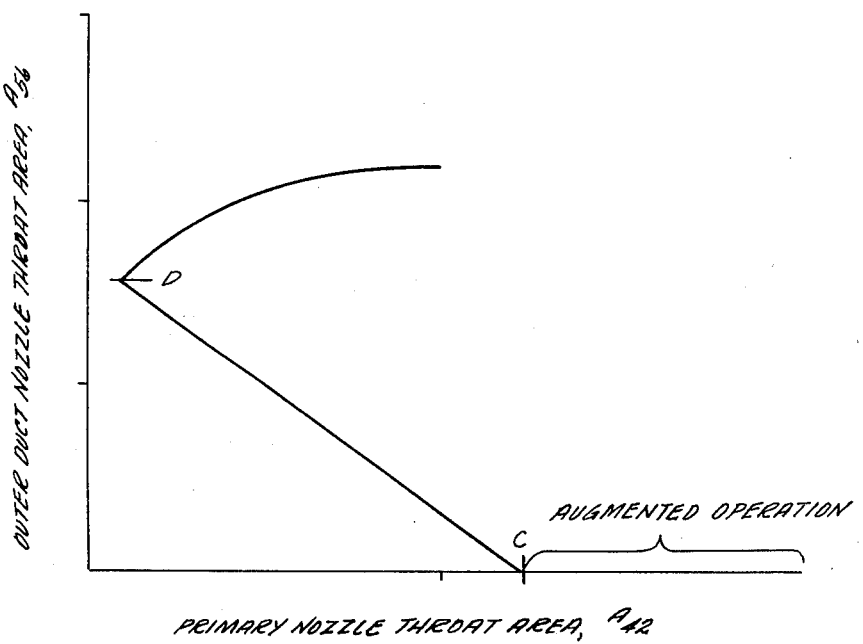
FIG. 3 graphically depicts the throat area schedule for the actuation system of FIG. 1.

Referring to FIGS. 2 through 4, the operating characteristics of this dual-flow, convergent-divergent exhaust device can be demonstrated. FIG. 2 graphically depicts the total exhaust device area ratio $[A_{60}/(A_{42} + A_{56})]$ as a function of total exhaust device throat area $[A_{42} + A_{56}]$, whereas FIG. 3 depicts the variation of outer duct nozzle throat area $A_{56}$ with primary nozzle throat area $A_{42}$.

During the augmented mode of operation, all of the flow is routed to the inner duct passage 19 wherein it is mixed with fuel and burned in afterburner 68. Outer duct flow is reduced (except for cooling flow through liner 20) by maintaining a nearly closed outer duct throat 56. This is accomplished by translating actuating ring 80 to its maximum rearward travel as shown in FIG. 4. The arrangement of the secondary nozzle causes the exit area $A_{60}$ to be at a maximum value and the secondary nozzle provides a common expansion surface for all of the exhaust flow. This is equivalent to operation at point B on the curve of FIG. 2.

As thrust is reduced during augmentation, actuation ring 80 is dragged to the left in FIG. 1 by actuator 84. Accordingly, primary nozzle throat area $A_{42}$ and exit area $A_{60}$ are reduced, while the outer duct remains substantially closed, causing an excursion down the curve of FIG. 2 to point C, where augmentation ceases and maximum nonaugmented (dry) power is obtained. Below the maximum dry power setting, as power is further reduced and the actuation ring is moved further forward (to the left), the outer passage throat area initially increases as the primary nozzle throat area decreases in order to maintain the total flow at a high level at these lower power settings (FIG. 3). This reduces inlet spillage drag and boattail drag as previously discussed. For further reductions in dry power past point D, primary nozzle throat area $A_{42}$ increases with increasing outer passage throat area $A_{56}$ due to the over-center capability of the bell crank 70 and link 74. Note that the curve of FIG. 2 reverses itself at point D but does not exactly retrace its former path since there are now two throats passing flow 42 and 56, instead of only one. Eventually, as power is further reduced, the total flow has to fall off in spite of the open nozzles since the pressure ratio across the nozzles will continue to fall even after the nozzles reach their maximum open position.

Thus, a simplified single actuation system has been provided for a dual-flow, variable cycle engine exhaust device. This system promises to be considerably lighter in weight than separate actuators on each nozzle.

It will be obvious to one skilled in the art that certain changes can be made to the above-described invention without departing from the broad inventive concepts thereof. For example, the present invention is not limited to secondary nozzles of the type depicted herein and numerous other arrangements of flaps, links and hinges are possible. Additionally, the actuation system is equally applicable to nozzles of the rectangular or two-dimensional variety and is not limited to axisymmetric nozzles. It is intended that the appended claims cover these and all other variations in the present invention's broader inventive concepts.

Having thus described the invention, what is claimed as novel and desired to be secured by Letters Patent of the United States is:

1. In a gas turbine engine exhaust device including a first duct terminating in first variable position flap means defining a first throat; and a second duct exterior of the first duct terminating in second variable position flap means, the first and second flap means cooperating to define a second throat therebetween; the improvement comprising an actuation system characterized by:
   a bell crank, having first and second arms, pivotably connected to the second flap means;
   link means operatively connecting the first of said arms and the first flap means; and
   means operatively connected to the second of said arms for positioning said second flap means and for pivoting said bell crank to simultaneously position said first flap means.

2. An actuation system for use in a gas turbine engine exhaust device including a first duct terminating in first variable position flap means defining a first throat; and a second duct exterior of the first duct terminating in second variable position flap means, the first and second flap means cooperating to define a second throat therebetween; said actuation system comprising:
   a bell crank, having first and second arms, pivotably connected to the second flap means;
   link means operatively connecting the first of said arms and the first flap means; and
   means operatively connected to the second of said arms for positioning said second flap means and for pivoting said bell crank to simultaneously position said first flap means.

3. The actuation system as recited in claim 2 wherein said positioning means includes a generally axially translatable actuation ring operatively connected to the second bell crank arm.

4. The actuation system as recited in claim 2 wherein the lengths of said arms and said link means, and the location of the bell crank pivot are such that, as the bell crank is pivoted, the second throat continues to increase as the first flap is first rotated away from and then toward said second duct.

5. The actuation system as recited in claim 4 wherein the second throat is substantially closed when said bell crank is fully pivoted in one direction and the second throat is substantially maximized when said bell crank is fully pivoted in the opposite direction.

6. The actuation system as recited in claim 5 further comprising stop means for limiting the degree of rotation of said bell crank about its pivot.

7. The actuation system as recited in claim 3 wherein said positioning means further includes a hydraulic actuator operatively connected to said actuation ring.

8. An actuation system for simultaneously controlling the flow areas defined by two generally coannular ducts, each duct terminating in variable position flap means hinge connected to their respective ducts, said actuation system comprising:
   a bell crank pivotable about an axis connected to the outer duct flap means;
   link means for connecting said bell crank and said inner duct flap means;
   means operatively connected to said bell crank for positioning said outer duct flap means and for pivoting said bell crank about its axis to simultaneously modulate the flow area between said inner and outer duct flap means and the area interior of said inner duct flap means.

* * * * *